(12) United States Patent
McElvain et al.

(10) Patent No.: US 8,274,717 B2
(45) Date of Patent: Sep. 25, 2012

(54) SYSTEM AND METHOD FOR CHARACTERIZING COLOR SEPARATION MISREGISTRATION

(75) Inventors: Jon McElvain, Manhattan Beach, CA (US); Charles Michael Hains, Altadena, CA (US)

(73) Assignee: Xerox Corporation, Norwalk, CT (US)

( * ) Notice: Subject to any disclaimer, the term of this patent is extended or adjusted under 35 U.S.C. 154(b) by 1322 days.

(21) Appl. No.: 11/496,909

(22) Filed: Aug. 1, 2006

(65) Prior Publication Data

US 2008/0030788 A1 Feb. 7, 2008

(51) Int. Cl.
*H04N 1/46* (2006.01)

(52) U.S. Cl. ......... 358/515; 358/1.9; 358/2.1; 358/3.26; 358/504; 382/162; 382/167

(58) Field of Classification Search .................. None
See application file for complete search history.

(56) References Cited

U.S. PATENT DOCUMENTS

| | | |
|---|---|---|
| 4,391,505 A | 7/1983 | Silverberg |
| 4,546,700 A | 10/1985 | Kishner et al. |
| 4,788,116 A | 11/1988 | Hochberg |
| 4,814,891 A | 3/1989 | Uchiyama et al. |
| 4,831,420 A | 5/1989 | Walsh et al. |
| 4,937,664 A | 6/1990 | Chiku et al. |
| 4,959,712 A | 9/1990 | Tsuzuki et al. |
| 5,081,507 A | 1/1992 | Monkelbaan et al. |
| 5,184,011 A | 2/1993 | Hubble, III et al. |
| 5,227,815 A | 7/1993 | Dastin et al. |
| 5,260,725 A | 11/1993 | Hammond |
| 5,272,493 A | 12/1993 | Hubble, III et al. |
| 5,278,625 A | 1/1994 | Charnitski et al. |
| 5,287,162 A | 2/1994 | de Jong et al. |
| 5,329,466 A | 7/1994 | Monney |
| 5,339,150 A | 8/1994 | Hubble, III et al. |
| 5,339,159 A | 8/1994 | Nakamura et al. |
| 5,342,715 A | 8/1994 | Kamath et al. |
| 5,384,592 A | 1/1995 | Wong |
| 5,406,066 A | 4/1995 | Steinle et al. |
| 5,418,556 A | 5/1995 | Andrews |
| 5,457,518 A | 10/1995 | Ashikaga et al. |
| 5,523,823 A | 6/1996 | Ashikaga |
| 5,526,140 A | 6/1996 | Rozzi |
| 5,537,190 A | 7/1996 | Folkins et al. |
| 5,572,601 A | 11/1996 | Bloomberg |
| 5,574,527 A | 11/1996 | Folkins |

(Continued)

OTHER PUBLICATIONS

Hains, "The Influence of Halftone Orientation on Color Gamut", Recent Progress in Digital Halftoning, IS&T Pub. (1995).

(Continued)

*Primary Examiner* — King Poon
*Assistant Examiner* — Dung Tran
(74) *Attorney, Agent, or Firm* — Kermit D. Lopez; Luis M. Ortiz; Tuesday A. Kaasch (57) ABSTRACT

A system and method is provided for characterizing color separation misregistration associated with marking a substrate. The method includes providing an input image having a plurality of patches, each patch having a pattern using a first and second color; marking a substrate with a copy of the input image using a first and second color separation to correspond to the first and second colors, respectively; and measuring a color characteristic of markings of respective copied patches of the copied plurality of patches and generating corresponding colorimetric values. Misregistration of the first color separation markings relative to the second color separation markings is characterized based on the measured calorimetric values.

19 Claims, 7 Drawing Sheets

U.S. PATENT DOCUMENTS

| | | | |
|---|---|---|---|
| 5,600,404 A | 2/1997 | Ando et al. | |
| 5,631,686 A | 5/1997 | Castelli et al. | |
| 5,636,330 A | 6/1997 | Barak | |
| 5,689,425 A * | 11/1997 | Sainio et al. | 700/124 |
| 5,760,815 A | 6/1998 | Genovese | |
| 5,768,671 A | 6/1998 | Komiya et al. | |
| 5,774,156 A | 6/1998 | Guerin | |
| 5,778,280 A | 7/1998 | Komiya et al. | |
| 5,793,901 A | 8/1998 | Matsutake et al. | |
| 5,808,658 A | 9/1998 | Hoover | |
| 5,825,984 A | 10/1998 | Mori et al. | |
| 5,887,996 A | 3/1999 | Castelli et al. | |
| 5,909,235 A * | 6/1999 | Folkins | 347/240 |
| 5,973,718 A | 10/1999 | Charnitski et al. | |
| 5,978,615 A | 11/1999 | Tanaka et al. | |
| 5,995,802 A | 11/1999 | Mori et al. | |
| 6,008,826 A * | 12/1999 | Foote et al. | 347/116 |
| 6,014,154 A | 1/2000 | Guerin | |
| 6,035,076 A | 3/2000 | Nagase | |
| 6,129,015 A | 10/2000 | Dewey | |
| 6,133,932 A | 10/2000 | Webb et al. | |
| 6,148,168 A * | 11/2000 | Hirai et al. | 399/301 |
| 6,154,628 A | 11/2000 | Kawano | |
| 6,164,847 A | 12/2000 | Allen | |
| 6,185,402 B1 | 2/2001 | Linssen | |
| 6,198,490 B1 | 3/2001 | Eom et al. | |
| 6,198,549 B1 | 3/2001 | Decker et al. | |
| 6,198,550 B1 | 3/2001 | Toyoda | |
| 6,215,512 B1 | 4/2001 | Imaizumi et al. | |
| 6,236,470 B1 | 5/2001 | Seachman | |
| 6,239,828 B1 | 5/2001 | Ito et al. | |
| 6,246,857 B1 | 6/2001 | Tanaka | |
| 6,253,678 B1 | 7/2001 | Wentworth | |
| 6,275,244 B1 | 8/2001 | Omelchenko et al. | |
| 6,288,556 B1 | 9/2001 | Sato et al. | |
| 6,292,208 B1 | 9/2001 | Lofhus et al. | |
| 6,295,435 B1 | 9/2001 | Shinohara et al. | |
| 6,300,968 B1 * | 10/2001 | Kerxhalli et al. | 347/116 |
| 6,310,681 B1 | 10/2001 | Taniwaki | |
| 6,321,060 B1 | 11/2001 | Nakayasu et al. | |
| 6,336,024 B1 | 1/2002 | Kanaya et al. | |
| 6,369,842 B1 | 4/2002 | Abramsohn | |
| 6,381,428 B1 | 4/2002 | Yamamoto et al. | |
| 6,404,517 B1 | 6/2002 | Chao | |
| 6,408,156 B1 * | 6/2002 | Miyazaki et al. | 399/301 |
| 6,434,279 B1 | 8/2002 | Shiba | |
| 6,441,915 B1 | 8/2002 | Imaizumi et al. | |
| 6,441,923 B1 | 8/2002 | Balasubramanian et al. | |
| 6,449,060 B1 | 9/2002 | Kawai et al. | |
| 6,456,310 B1 | 9/2002 | Wallace et al. | |
| 6,456,311 B1 | 9/2002 | Harush et al. | |
| 6,459,823 B2 | 10/2002 | Altunbasak et al. | |
| 6,462,821 B1 | 10/2002 | Borton et al. | |
| 6,493,010 B1 | 12/2002 | Takahashi et al. | |
| 6,493,011 B1 | 12/2002 | Shioya | |
| 6,493,064 B2 | 12/2002 | Cabiri et al. | |
| 6,493,083 B2 * | 12/2002 | Parisi et al. | 356/399 |
| 6,526,240 B1 | 2/2003 | Thomas et al. | |
| 6,529,616 B1 * | 3/2003 | Rasmussen et al. | 382/112 |
| 6,556,313 B1 | 4/2003 | Chang et al. | |
| 6,643,035 B1 | 11/2003 | Salgado | |
| 6,644,773 B2 | 11/2003 | Bildstein et al. | |
| 6,731,889 B2 * | 5/2004 | Nakayama | 399/49 |
| 6,804,485 B2 | 10/2004 | Martin et al. | |
| 6,842,590 B2 | 1/2005 | Dalal et al. | |
| 6,856,336 B2 | 2/2005 | Toyoda | |
| 6,889,028 B1 | 5/2005 | Hunold et al. | |
| 6,909,516 B1 | 6/2005 | Hoover | |
| 6,911,993 B2 | 6/2005 | Nishikawa et al. | |
| 6,973,272 B2 | 12/2005 | Yamamoto et al. | |
| 7,002,701 B1 | 2/2006 | Nakayasu et al. | |
| 7,013,094 B2 | 3/2006 | Dalal et al. | |
| 7,013,803 B2 | 3/2006 | Hansen et al. | |
| 7,039,348 B2 | 5/2006 | Kerxhalli et al. | |
| 7,071,957 B2 | 7/2006 | Fujimoto | |
| 7,075,561 B2 | 7/2006 | Ozawa et al. | |
| 7,085,009 B2 | 8/2006 | Kawai et al. | |
| 7,100,508 B1 | 9/2006 | Mader | |
| 7,106,477 B2 | 9/2006 | Horobin | |
| 7,127,125 B2 | 10/2006 | Perlmutter et al. | |
| 7,239,833 B2 | 7/2007 | Tomita et al. | |
| 7,257,358 B2 | 8/2007 | Overall et al. | |
| 7,376,375 B2 * | 5/2008 | Kobayashi et al. | 399/301 |
| 7,438,379 B2 * | 10/2008 | Ishibashi et al. | 347/19 |
| 7,443,535 B2 | 10/2008 | Ishibashi | |
| 7,512,377 B2 | 3/2009 | Choi et al. | |
| 7,610,004 B2 | 10/2009 | Kato et al. | |
| 7,630,672 B2 * | 12/2009 | Baretsky et al. | 399/301 |
| 7,652,790 B2 * | 1/2010 | Touura | 358/1.9 |
| 7,658,462 B2 * | 2/2010 | Eom | 347/19 |
| 7,706,031 B2 * | 4/2010 | Viturro et al. | 358/504 |
| 7,826,095 B2 | 11/2010 | Wang et al. | |
| 7,843,604 B2 * | 11/2010 | Higashiyama et al. | 358/1.9 |
| 7,894,109 B2 * | 2/2011 | McElvain et al. | 358/515 |
| 7,933,034 B2 | 4/2011 | Takano | |
| 2001/0017645 A1 | 8/2001 | Toda | |
| 2001/0021208 A1 | 9/2001 | Ueyanagi et al. | |
| 2001/0033395 A1 | 10/2001 | Chizawa | |
| 2001/0033686 A1 | 10/2001 | Klassen | |
| 2002/0063907 A1 | 5/2002 | Harrington | |
| 2002/0102114 A1 | 8/2002 | Kawanishi | |
| 2002/0113968 A1 | 8/2002 | Parisi et al. | |
| 2002/0118350 A1 | 8/2002 | Cabiri et al. | |
| 2002/0122124 A1 | 9/2002 | Suda | |
| 2002/0159802 A1 | 10/2002 | Katahira | |
| 2002/0178952 A1 | 12/2002 | Sainio et al. | |
| 2003/0002043 A1 | 1/2003 | Abdulhalim et al. | |
| 2003/0044193 A1 | 3/2003 | Thomas et al. | |
| 2003/0052959 A1 | 3/2003 | Fujimoto | |
| 2003/0053093 A1 | 3/2003 | Eom | |
| 2003/0063301 A1 * | 4/2003 | Klassen | 358/1.9 |
| 2003/0086103 A1 * | 5/2003 | Mestha et al. | 358/1.9 |
| 2003/0090689 A1 | 5/2003 | Klassen | |
| 2003/0098985 A1 | 5/2003 | Horobin et al. | |
| 2003/0145745 A1 | 8/2003 | Hansen et al. | |
| 2003/0145751 A1 | 8/2003 | Hansen et al. | |
| 2003/0174184 A1 | 9/2003 | Bildstein et al. | |
| 2003/0197877 A1 | 10/2003 | Lee | |
| 2003/0210412 A1 * | 11/2003 | Ishibashi | 358/1.9 |
| 2003/0214568 A1 | 11/2003 | Nishikawa et al. | |
| 2004/0046981 A1 | 3/2004 | Taka et al. | |
| 2004/0076450 A1 | 4/2004 | Martin et al. | |
| 2004/0114025 A1 | 6/2004 | Kerxhalli et al. | |
| 2004/0130737 A1 | 7/2004 | Kamimura et al. | |
| 2004/0175196 A1 | 9/2004 | Yamamoto et al. | |
| 2004/0191652 A1 * | 9/2004 | Dishon et al. | 430/30 |
| 2004/0227966 A1 * | 11/2004 | Lee | 358/1.9 |
| 2004/0239746 A1 | 12/2004 | Ozawa et al. | |
| 2005/0047834 A1 | 3/2005 | Tomita et al. | |
| 2005/0069220 A1 | 3/2005 | Czyszczewski et al. | |
| 2005/0093956 A1 | 5/2005 | Egan | |
| 2005/0111759 A1 | 5/2005 | Perlmutter et al. | |
| 2005/0134874 A1 | 6/2005 | Overall et al. | |
| 2005/0157297 A1 | 7/2005 | Abdulhalim et al. | |
| 2005/0157317 A1 * | 7/2005 | Butterfield et al. | 358/1.9 |
| 2005/0206934 A1 | 9/2005 | Nishikawa et al. | |
| 2005/0206980 A1 | 9/2005 | Nishikawa et al. | |
| 2005/0208685 A1 | 9/2005 | Abdulhalim et al. | |
| 2005/0214037 A1 | 9/2005 | Kishi | |
| 2005/0281459 A1 | 12/2005 | Bala et al. | |
| 2006/0001765 A1 | 1/2006 | Suda | |
| 2006/0005722 A1 | 1/2006 | Nobukawa et al. | |
| 2006/0013603 A1 | 1/2006 | Matsuyama | |
| 2006/0056882 A1 | 3/2006 | Kwon et al. | |
| 2006/0065625 A1 | 3/2006 | Abdulhalim et al. | |
| 2006/0114282 A1 | 6/2006 | Mizes et al. | |
| 2006/0114283 A1 | 6/2006 | Mizes et al. | |
| 2006/0115303 A1 | 6/2006 | Kang et al. | |
| 2006/0119690 A1 | 6/2006 | Park | |
| 2006/0120626 A1 | 6/2006 | Perlmutter et al. | |
| 2006/0120772 A1 | 6/2006 | Kitazawa et al. | |
| 2006/0132807 A1 | 6/2006 | Abdulhalim et al. | |
| 2006/0139433 A1 | 6/2006 | Yoshida | |
| 2006/0159337 A1 | 7/2006 | Pearson et al. | |
| 2006/0164506 A1 | 7/2006 | Kitao | |
| 2006/0171748 A1 | 8/2006 | Inui et al. | |
| 2006/0176354 A1 | 8/2006 | Yoshida | |

| | | |
|---|---|---|
| 2006/0176355 A1 | 8/2006 | An |
| 2006/0177246 A1 | 8/2006 | Kawada et al. |
| 2006/0182472 A1 | 8/2006 | Munakata et al. |
| 2006/0191437 A1 | 8/2006 | Mader |
| 2006/0244980 A1 | 11/2006 | Grace |
| 2006/0262326 A1 | 11/2006 | Abdulhalim et al. |
| 2006/0263120 A1 | 11/2006 | Hayakawa |
| 2006/0275057 A1 | 12/2006 | Suzuki |
| 2006/0290767 A1 | 12/2006 | Tezuka et al. |
| 2007/0002403 A1* | 1/2007 | Klassen ............ 358/504 |
| 2007/0003332 A1 | 1/2007 | Kim |
| 2007/0019056 A1 | 1/2007 | Jung et al. |
| 2007/0048031 A1 | 3/2007 | Kinoshita |
| 2007/0077059 A1 | 4/2007 | Denoue et al. |
| 2007/0095235 A1 | 5/2007 | Nielsen et al. |
| 2007/0115339 A1 | 5/2007 | Matsuzaki et al. |
| 2008/0030787 A1 | 2/2008 | McElvain |
| 2008/0030788 A1 | 2/2008 | McElvain et al. |
| 2008/0030789 A1 | 2/2008 | McElvain et al. |
| 2008/0294363 A1 | 11/2008 | Parmar et al. |

OTHER PUBLICATIONS

Oztan et al., "Quantitive Evaluation of Misregistration Induced Color Shifts in Color Halftones", Electronic Imaging, vol. 5667, p. 225 (2000).

Yang et al., "Light Scattering and Ink Penetration Effects on Tome Reproduction", Pics 2000: Image Processing, Sys, Conf., Portland, OR, p. 225 (2000).

Arney et al., "Kubelka-Munk Theory and the MTF of Paper", Journ. of Imaging Science and Tech., vol. 47, No. 4, p. 339 (2003).

Arney et al., "Kubelka-Munk Theory and the MTF of Paper", *Journal of Imaging Science and Tech.*, vol. 47, No. 4, pp. 339-345 (Jul./Aug. 2003).

Oztan et al., "Quantitative Evaluation of Misregistration Induced Color Shifts in Color Halftones", *Color Imaging X: Processing, Hardcopy, and Applications, Proc. of SPIE=IS&T Electronic Imaging, SPIE* vol. 5667, pp. 501-512 (2005).

Sharma, "Digital Color Halftones", *Digital Color Imaging Handbook*, Ch. 6, E. (Dec. 2002).

Yang et al., "Light Scattering and Ink Penetration Effects on Tone Reproduction", *Inst. of Science and Tech.*, Linkping Univ., Sweden, *PICS'2000* (Mar. 2000).

Shen, H.-L. et al., "Spectral characterization of a color scanner by adaptive estimation," J. Opt. Soc. Am. A. (2004) 21(7):1125-1130, July.

Shi, M. et al., "Using reflectance models for color scanner calibration," J. Opt. Soc. Am. A. (2002) 19(4):645-656, April.

U.S. Appl. No. 11/496,907, Office Action Communication dated Mar. 1, 2010.

U.S. Appl. No. 11/496,907, Office Action Communication dated Aug. 5, 2010.

U.S. Appl. No. 11/496,907, Office Action Communication dated Oct. 6, 2010.

U.S. Appl. No. 11/496,907, Office Action Communication dated Aug. 22, 2011.

U.S. Appl. No. 11/496,907, Office Action Communication dated Dec. 16, 2011.

U.S. Appl. No. 11/496,907, Notice of Allowance dated Feb. 27, 2012.

U.S. Appl. No. 11/804,806, Office Action Communication dated Jan. 8, 2010.

U.S. Appl. No. 11/804,806, Office Action Communication dated Mar. 26, 2010.

U.S. Appl. No. 11/804,806, Office Action Communication dated Jun. 24, 2010.

U.S. Appl. No. 11/804,806, Office Action Communication dated Aug. 17, 2010.

U.S. Appl. No. 11/804,806, Office Action Communication dated Sep. 7, 2010.

U.S. Appl. No. 11/804,806, Office Action Communication dated Sep. 8, 2011.

U.S. Appl. No. 11/804,806, Notice of Allowance dated Feb. 21, 2012.

* cited by examiner

SYSTEM AND METHOD FOR CHARACTERIZING COLOR SEPARATION MISREGISTRATION

CROSS-REFERENCE TO RELATED U.S. PATENT APPLICATIONS

The present disclosure is related to U.S. patent applications entitled "SYSTEM AND METHOD FOR CHARACTERIZING SPATIAL VARIANCE OF COLOR SEPARATION MISREGISTRATION", and "SYSTEM AND METHOD FOR HIGH RESOLUTION CHARACTERIZATION OF SPATIAL VARIANCE OF COLOR SEPARATION MISREGISTRATION", both of which are concurrently filed, assigned to the present assignee and hereby incorporated by reference.

BACKGROUND

The present disclosure relates generally to a system and method for color printing. In particular, the present disclosure relates to a system and method for characterizing color separation misregistration.

In multi-color printing systems a limited number of color separations are used for marking a substrate for achieving a wider variety of colors, with each separation marking the substrate using discrete shapes, such as dots having a circular or oval shape, or periodic line patterns. This concept is generally known as color halftoning, and involves combining two or more patterned separations on the substrate. The selection of color separations and halftone design are carefully chosen for achieving a visual effect of the desired color.

Many prior art printing systems use cyan, magenta, yellow and black (also referred to as CMYK) color separations that mark a substrate using discrete cluster dots. In accordance with one prior art method, the dots may be marked in a dot-on-dot fashion, by marking the substrate with a first and second color separation, with the dots of the second color separation superimposed over the dots of the first color separation for achieving the desired color. In accordance with a second prior art method, the dots are applied in a dot-off-dot fashion, with the dots of the second color separation placed in the voids of the dots the first color separation for achieving the desired color. Multi-color printing systems are susceptible to misregistration between color separations due to a variety of mechanical related issues. For both dot-on-dot and dot-off-dot rendering, color separation misregistration may cause a significant color shift in the actual printed color that is noticeable to the human eye.

Another marking method of rotated cluster dot sets is widely used since anomalies (e.g., color shifts) due to color separation misregistrations are subtle and less detectable by the human eye. However, even in these cases color misregistrations can be objectionable, particularly at edges of objects that contain more than one separation. Therefore it is important to characterize color separation misregistration in order to perform corrective action in the print engine.

Many prior art methods for characterizing misregistration of color separations include using physical registration marks. The registration marks include two fine straight lines, each line formed using a different color separation. The two lines are aligned and joined to form one straight line. Alignment of the two lines is analyzed, with misalignment indicating misregistration of one of the color separations relative to the other. The analysis may include studying the printed registration marks with a microscope and visually determining if misregistration has occurred. Such analysis is tedious and not conducive to automation. The analysis may include imaging the marker with a high resolution scanning device and analyzing the high resolution scanned image using complex software for determining the positions of the registration marks relative to one another. This type of analysis can require expensive high resolution scanning equipment and may involve a significant amount of computational power. Furthermore, this type of processing is prone to error due to even small defects, such as toner splatter.

In another prior art method used for higher end printer devices outputting high volume and/or high quality images, misregistration of color separations is characterized by measuring the transition time between the edges of two primary separation patches (e.g., cyan and magenta) on a moving photoreceptor belt. The patches have angled edges (e.g., chevrons) that allow the determination of misregistration in both the fast scan direction (transverse to the longitudinal axis of the photoreceptor belt) and slow scan direction (parallel to the longitudinal axis of the photoreceptor belt). Simple photodetectors are used to measure the time between the moving edges of the chevrons, and this can in turn be used to compute the misregistration in both slow and fast scan directions. A drawback to this method is the inability to take misregistration measurements across the page, as the photodetectors are present in only two or three locations across the width of the photoreceptor belt. This method of separation misregistration characterization has been designated for use with high end printer systems due to the cost of the photodetectors and associated analysis software.

To overcome the drawbacks in the prior art, it is an aspect of the present disclosure to provide a system and method for characterizing misregistration of color separations using a method that is conducive to real time measurement using low resolution scanning technology.

It is another aspect of the present disclosure to provide a system and method for analyzing a test pattern using simple processing of few elements for minimizing the processing load.

It is another aspect of the present disclosure to print and analyze a test pattern, where the analysis is highly immune to page defects upon which the test pattern is printed.

SUMMARY

The present disclosure is directed to a color separation misregistration characterization system. The system includes a processor for receiving a colorimetric value corresponding to a calorimetric measurement of respective marked patches of a plurality of marked patches included in an output image output by a printer device using color separations of a color space for marking a substrate, each patch of the plurality of marked patches having markings of a first and second color separation. The processor includes a phase lag analysis module which is executable on the processor characterizing misregistration of the first color separation relative to the second color separation based on the received calorimetric values. For the purpose of this discussion, colorimetric refers to any measurement of color, including both human-visual color values such as CIE L*a*b*, XYZ, as well as non-human-visual color values such as RGB and CMYK.

The present disclosure is also directed to a method for characterizing color separation misregistration of a printer device using color separations of a color space for marking a substrate. The method includes receiving a colorimetric value corresponding to a colorimetric measurement of respective patches of a plurality of patches included in an output image output by the printer device, each patch of the plurality of patches having markings of a first and second color separation of the color space. The misregistration of the first color separation relative to the second color separation is characterized based on the received calorimetric values.

The present disclosure is further directed to a method for characterizing color separation misregistration associated with marking a substrate. The method includes providing an input image having a plurality of patches, each patch having a pattern using a first and second color; marking a substrate with a copy of the input image using a first and second color separation to correspond to the first and second colors, respectively; and measuring a color characteristic of markings of respective copied patches of the copied plurality of patches and generating corresponding calorimetric values. Misregistration of the first color separation markings relative to the second color separation markings is characterized based on the measured colorimetric values.

Other features of the presently disclosed system and method for characterization of color separation misregistration will become apparent from the following detailed description, taken in conjunction with the accompanying drawings, which illustrate, by way of example, the presently disclosed system and method.

BRIEF DESCRIPTION OF THE DRAWINGS

Various embodiments of the present disclosure will be described below with reference to the figures, wherein.

DETAILED DESCRIPTION

Referring now to the drawing figures, in which like references numerals identify identical or corresponding elements, the color separation misregistration characterization (CSMC) system and method in accordance with the present disclosure will now be described in detail. With initial reference to FIG. 1, an exemplary CSMC system in accordance with the present disclosure is illustrated and is designated generally as CSMC system 100. CSMC system 100 includes a printer device 102 and an analysis unit 104. An input image 105 having a plurality of color patches 106 is input to the printer device 102 which marks a substrate with an image that corresponds to the input image 105. The marked substrate is output as an output image 107 having a plurality of marked color patches 108 that correspond to respective color patches 106 of the input image 105. The output image 107 is submitted to the analysis unit 104 for analysis of colors of the respective marked color patches 108 of the output image 107.

The term "printer device" as used herein encompasses any apparatus or system, such as a digital copier, xerographic printing system, ink jet printing system, reprographic printing system, bookmaking machine, facsimile machine, multifunction machine, textile marking machine, etc., which performs a marking output function for any purpose. The modality for marking may include, for example, applying toner, ink, dye, etc., to the substrate or embossing, peening, etching, etc. the substrate. The substrate may be a material such as paper, cardboard, a transparency, a paper derivative, metal, plastic, glass, wood, cloth, etc.

Figure 2:
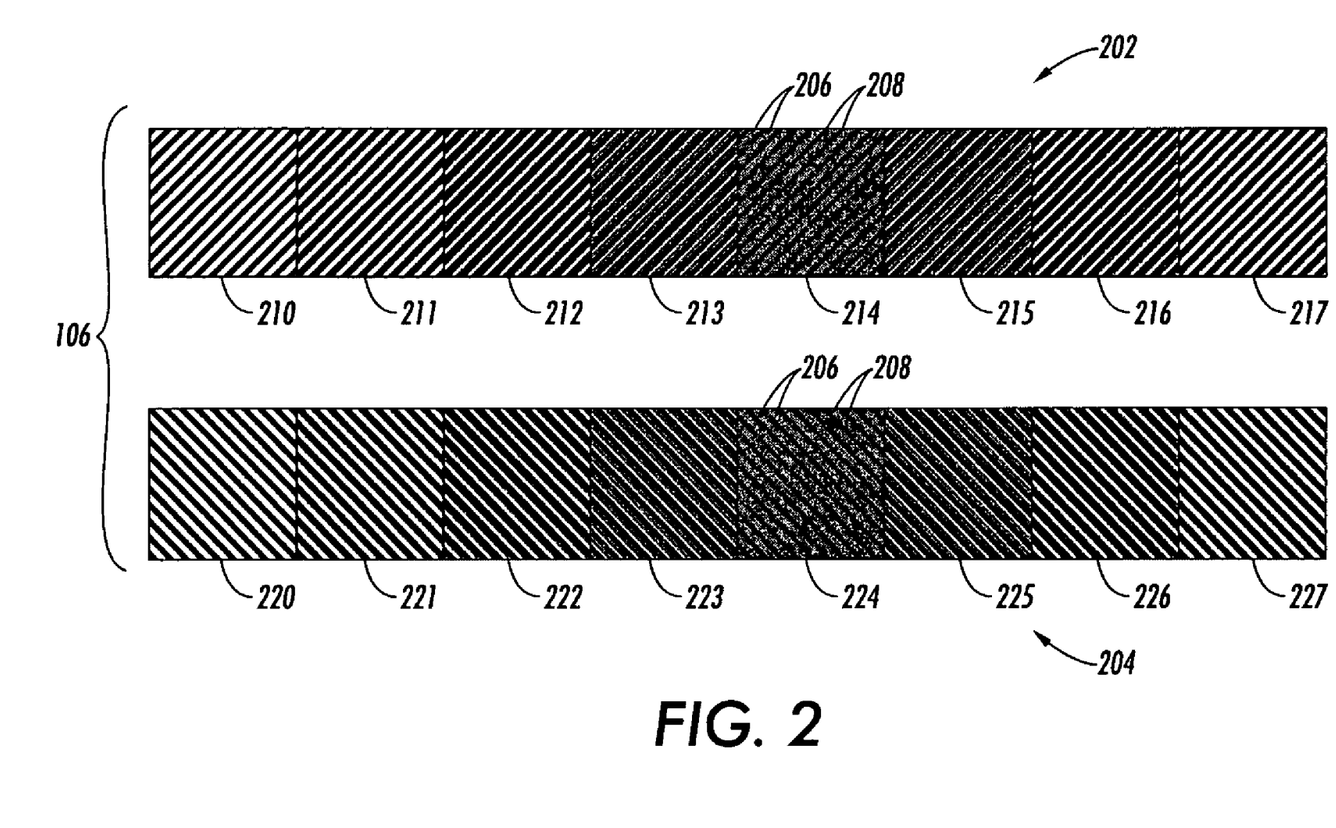
FIG. 2 is a diagram of a portion of an image input to a printer device of the system shown in FIG. 1.

FIG. 2 shows at least a portion of the plurality of patches 106 of an exemplary input image 105 in greater detail. The plurality of patches 106 of the input image 105 includes at least a first series of patches 202 and a second series of patches 204. In the first series 202, each patch includes an image line screen having a plurality of parallel lines, including lines formed of a first color separation 206 (such as cyan, shown as the lighter shaded lines 206) and lines formed of a second color separation 208 (such as magenta, shown as the darker shaded lines 208).

The first series 202 includes eight patches numbered 210-217, with the lines shown oriented at a 45° angle relative to the horizontal. The first patch 210 uses a line-on-line rendering, and the fifth patch 214 uses a line-off-line rendering. Line-on-line refers to lines of a first color separation superimposed over the lines of a second color separation for achieving a desired color, similar to dot-on-dot, and line-off-line refers to the lines of a first color separation placed in the voids of the lines of a second color separation for achieving a desired color, similar to dot-off-dot.

The lines 208 remain in a fixed position in all of the patches 210-217. For patches 211-217, the lines 206 are translated or displaced by an incremental amount relative to the previous patch in a horizontal direction, which is equivalent to translating them by (1/square root 2) or 0.707 times the increment in a direction that is perpendicular to the orientation of the lines 206 and 208. The displacement of lines 206 relative to lines 208 is also referred to as phase shift or screen displacement. As the lines 206 are translated incrementally in each subsequent patch, the line-on-line pattern of patch 210 transitions gradually to the line-off-line pattern of patch 214, and then gradually towards a line-on-line rendering again in patches 215-217, completing a full cycle or halftone period.

In the example shown, the translation increment is ¼ the width of the lines 206 and 208 (all having an equal width that is half the width of the line-screen period). The transition from patch 210 to 217 represents a full halftone period, with each of the eight patches 210-217 representing a ⅛ halftone period. The color characteristics of the patches 211-217 change due to the different overlap of lines 206 relative to 208. For example, the fifth patch 214 in which the lines are rendered line-off-line has the greatest chroma, which refers here to the degree of colorfulness. The change in color characteristics (e.g., chroma) is measurable. Likewise, differences in lightness (luminance) between these patches are also measurable.

The second series 204 includes eight patches numbered 220-227, with the lines 206 and 208 shown oriented at 90° angle relative to the lines of the first series 202, which is a 135° angle relative to the horizontal. The first patch 220 uses a line-on-line rendering, and the fifth patch 224 uses a line-off-line rendering.

As in the first series 202, the lines 208 of the second series 204 remain in a fixed position as the lines 206 are incrementally translated in a direction that is perpendicular to the orientation of the lines 206 and 208. As the lines 206 are translated incrementally in each subsequent patch, the line-on-line pattern of patch 220 transitions gradually to the line-off-line pattern of patch 224 and then gradually towards a line-on-line rendering again in patches 225-227. Measurements of one or more color characteristics (chroma or lightness (luminance)) of patches 220-227 are indicative of color separation misregistration, as described further below.

Figure 1:
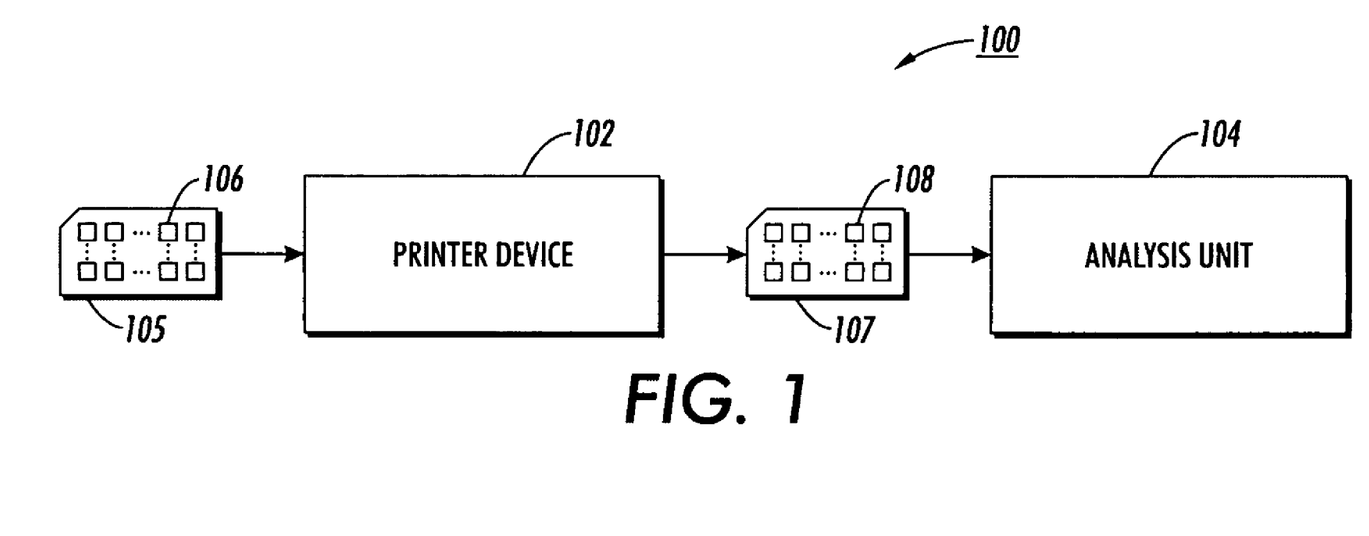
FIG. 1 is a block diagram of an exemplary color separation misregistration characterization system in accordance with the present disclosure.

The printer device 102 receives the input image 105 and outputs output image 107. The input image 105 may be received as a digital file in a printer ready language, often referred to as a page description language, such as PostScript™, PDF™, or PCL™. The digital file may be received by the printer device 102 via a job request from a remote or local device, such as a computer terminal or scanner (not shown), or by scanning in a document having the plurality of patches 106 printed or marked thereon. In the latter case, the scanning is performed by positioning the document on a scanner plate or platen glass of the printer device 102, and the document is scanned in by a scanner integrated with the printer device 102.

The printer device 102 marks a substrate in accordance with the input image 105 generating the output image 107. The patches are in the form of binary lineart and do not require further halftoning. When color separation registration of the printer device 102 is ideal (e.g., no color separation misregistration), the output image 107 is substantially identical to the input image 105, and the color characteristics of the patches 108 are substantially identical to the color characteristics of the patches 106.

Figure 3:
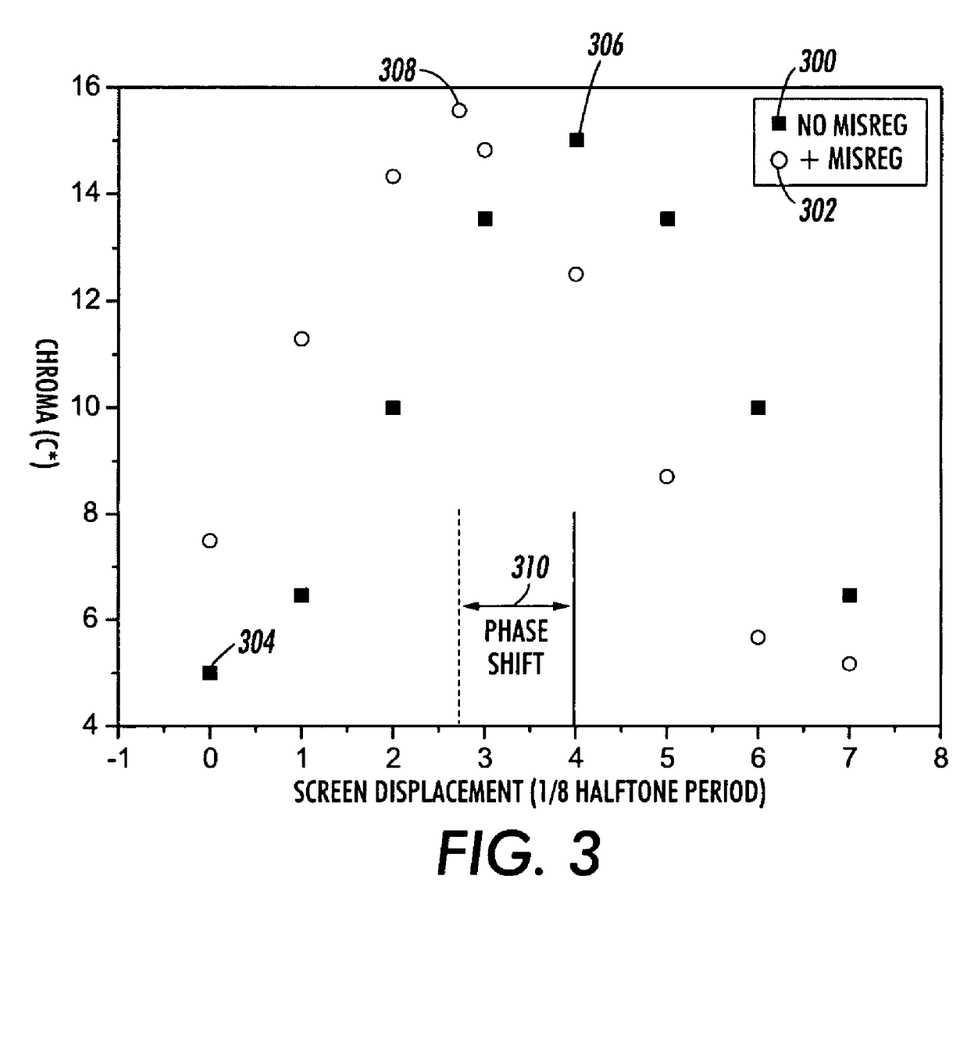
FIG. 3 is a plot of measured chroma for a series of patches of an image output by the printer device of the system shown in FIG. 1, and a plot of expected chroma for a theoretical image output by a printer device in which color separation registration is ideal.

FIG. 3 shows a plot of points of curves 300 and 302 of chroma of a first series of patches of patches 108 of the output image 107 which correspond to the first series of patches 202 of the input image 105 in which the plurality of lines 206 is oriented at 45° relative to the horizontal. Curve 300 shows expected chroma measurements for the first series of patches of patches 108 for ideal registration of color separation, and curve 302 shows chroma measurements for the first series of patches of patches 108, where color separation misregistration exists. The curve 300 is sinusoidal, with a minimum point designated by reference numeral 304. The minimum point 304 corresponds to a minimum chroma intensity measurement expected for the patch corresponding to zero displacement in which a line-on-line pattern is printed.

The sinusoidal curve 300 has a peak designated by reference numeral 306. The peak 306 corresponds to a maximum chroma intensity measurement expected for the patch corresponding to the 4/8 halftone period screen displacement in which a line-off-line pattern is printed. The curve 302 is also sinusoidal, however once the curve is fit to the measured points it can be determined that the peak of the fit curve occurs somewhere between patches corresponding to the 2/8 and 3/8 halftone period screen displacements, designated by reference numeral 308. The offset of the peak of curve 302 relative to the peak of curve 304, referred to as phase lag and designated by reference numeral 310, indicates the amount by which the curves 300 and 302 are out of phase. The phase lag is indicative of the degree and direction of relative misregistration between the two color separations used for patches 210-217 and 220-227 (cyan and magenta in the present example).

Figure 4:
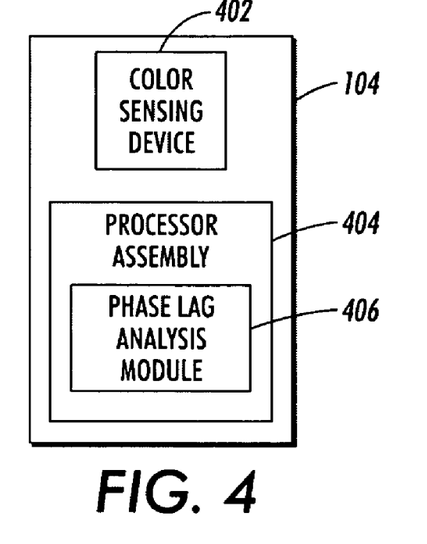
FIG. 4 is an embodiment of an analysis unit of the system shown in FIG. 1.

Measurements of the color characteristics and analysis of the measurements for characterizing color separation misregistration are performed by the analysis unit 104. FIG. 4 shows one embodiment of the analysis unit 104, where the analysis unit 104 includes a color sensing device 402 that measures at least one characteristic of color of the color patches 108. The color sensing device 402 may include an illumination device having at least one light source, an aperture through which reflected light (ambient light and/or light generated by the at least one light source) enters, and an array of photo detectors for sensing light having entered through the aperture and outputting a signal indicative of at least one color characteristic. The output signal may have a property (e.g., a magnitude) that is indicative of an average value of the output by the photo detectors of the array. One example of a color sensing device 402 is a spectrophotometer.

The color sensing device 402 may be a handheld device which a user physically holds and moves over the output image 107 for scanning the output image 107. Alternatively, the color sensing device 402 may be a non-portable device which receives the output image 107 and automatically scans the output image 107. The color sensing device 402 outputs an analog or digital signal. If the signal is analog, it is converted to a digital signal. The analog-to-digital conversion may be performed by analog-to-digital converter (ADC) circuitry integrated with the color sensing device 402 or external from the color sensing device 402. The digital signal includes a calorimetric quantity that is indicative of results of the color measurements sensed by the color sensing device 402, such as luminance, reflectance, chroma, or a combination thereof. The color measurement may include measurements of human-visual color values such as CIE L*a*b*, XYZ, or non-human-visual color values such as RGB and CMYK, or a combination thereof. For example, the calorimetric values may include an average color value for each patch, a color value for one or more samples (e.g., dots, portions or small areas, etc.) of each respective patch, or a function of multiple samples for each respective patch.

The colorimetric value may be expressed using a model, such as the Lab Color Model (lightness (luminance), a* and b*), as is known in the art for describing color in three dimensions, on x, y and z axes. The z (vertical) axis corresponding to lightness (luminance), and the x and y axes corresponding to the a* and b* channel, with the a* channel representing color transitions between red and green, and the b* channel representing color transitions between blue and yellow. The color value may be expressed in terms of luminance only, in terms of chroma only or a combination thereof. In accordance with the CIE L*a*b* model, the chroma corresponds to the a* and b* channels only, where the chroma magnitude corresponds to the radius of a vector in the a*b* plane. Other models or methods may be used for describing color characteristics, such as in terms of RGB (red-green-blue) or CMYK (cyan-magenta-yellow-black) color spaces.

The measured colorimetric values output by the color sensing device 402 are provided to a processor assembly 404 having at least one processor. A phase lag analysis module 406 executable on the at least one processor receives the measured calorimetric values, fits the measured colorimetric values to a curve, and compares the fit curve to an expected curve for ideal registration. Specifically, the phase lag analysis module 406 determines the phase lag between the peak of the fit curve and the peak of the expected curve by determining the magnitude and direction in which the screen displacement value corresponding to the peak of the fit curve is offset from the screen displacement value corresponding to the peak of the expected curve. A similar phase lag determination may be made by determining for the offset between the minimum or lowest point of the fit curve and the screen displacement value corresponding to the minimum point of the expected curve instead of, or in addition to, the determination of the peak phase lag, however determination of the peak phase lag may be sufficient. For the purpose of simplicity, reference to peak phase lag or phase lag may also or alternatively apply to minimum point phase lag. For a somewhat courser determination of the phase lag which involves less processing, the step of fitting a curve to the measured points may be skipped, and the screen displacement values corresponding to the peak value (and/or minimum value) of the received colorimetric values may be compared to the screen displacement value corresponding to the peak (and/or minimum point of the expected curve).

Figure 5:
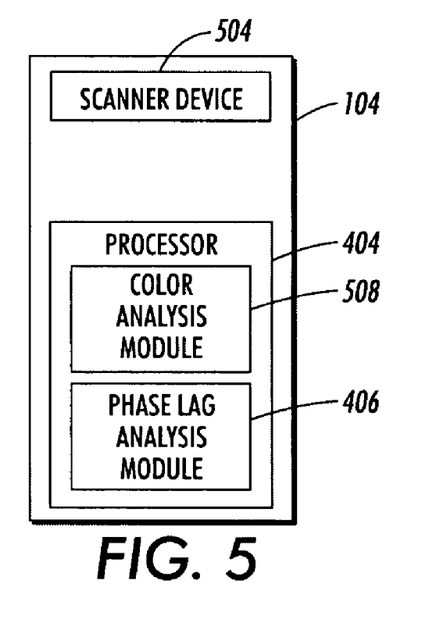
FIG. 5 is another embodiment of the analysis unit of the system shown in FIG. 1.

In another embodiment of the analysis unit 104 shown in FIG. 5, a scanner device 504 is provided instead of the color sensing device 402. The output from the scanner device 504 is provided to the processor assembly 404. A color analysis module 508 executable on the processor assembly 404 receives and analyzes the output from the scanner device 504 for generating measurement calorimetric values associated with the respective patches of output image 107. As in the embodiment shown in FIG. 2, the phase lag analysis module 406 receives the measured calorimetric values, fits the measured calorimetric values to a curve, and compares the fit curve to an expected curve, including determining the phase lag between the peak (and/or minimum point) of the fit curve and the peak (and/or minimum point) of the expected curve. The step of fitting the curve may be omitted and maximum calorimetric values may be compared to maximum expected values.

The peak (and/or minimum point) phase lag is next determined for a second series of patches 108 that correspond to the second set of patches 202 which are oriented at 135° relative to the horizontal. The peak phase lag for the first series is used to determine the misregistration detected in the first series, $M_{45}^{CM}$, and the peak phase lag for the second series is used to determine the misregistration detected in the second series, $M_{135}^{CM}$.

For the current example, using the cyan and magenta color separations and first and second series or patches oriented at 45° and 135°, respectively:

$$M_{45}^{CM} = PS_{45}^{CM} * D \quad (1)$$

$$M_{135}^{CM} = PS_{135}^{CM} * D$$

where:

$M_{45}^{CM}$ is the misregistration of cyan relative to magenta for lines oriented at 45°;

$M_{135}^{CM}$ is the misregistration of cyan relative to magenta for lines oriented at 135°;

$$PS_{45}^{CM} = (\text{expected } SD_{45}^{CM} - \text{measured } SD_{45}^{CM})/N; \quad (2)$$

$$PS_{135}^{CM} = (\text{expected } SD_{135}^{CM} - \text{measured } SD_{135}^{CM})/N;$$

D is the period (in microns or inches) of the line screen of the output image 107 described in terms of distance between adjacent lines;

SD=screen displacement; and

N is=the number of patches in a full cycle of translating one set of lines relative to another set of lines.

Misregistration in the fast and slow scan directions is determined by performing a simple rotation operation:

$$M_f^{CM} = 1/\sqrt{2}(M_{45}^{CM} + M_{135}^{CM})$$

$$M_s^{CM} = 1/\sqrt{2}(M_{45}^{CM} - M_{135}^{CM}) \quad (3)$$

where:

$M_f^{CM}$ is the misregistration in the fast scan direction of the cyan and magenta color separations with respect to one another; and $M_s^{CM}$ is the misregistration in the slow scan direction of the cyan and magenta color separations with respect to one another. In an equivalent fashion, one can also compute the slow and fast scan misregistrations by using line screens oriented at 0 and 90 degrees relative to the page edges. In that case, no rotation operation needs to be performed.

Each software module, including the phase lag analysis module 406 and the color analysis module 508, includes a series of programmable instructions capable of being executed by the processor assembly 404. The series of programmable instructions can be stored on a computer-readable medium, such as RAM, a hard drive, CD, smart card, 3.5" diskette, etc., or transmitted via propagated signals for being executed by the processor assembly 404 for performing the functions disclosed herein and to achieve a technical effect in accordance with the disclosure. The functions of the respective software modules may be combined into one module or distributed among a different combination of modules.

Figure 6:
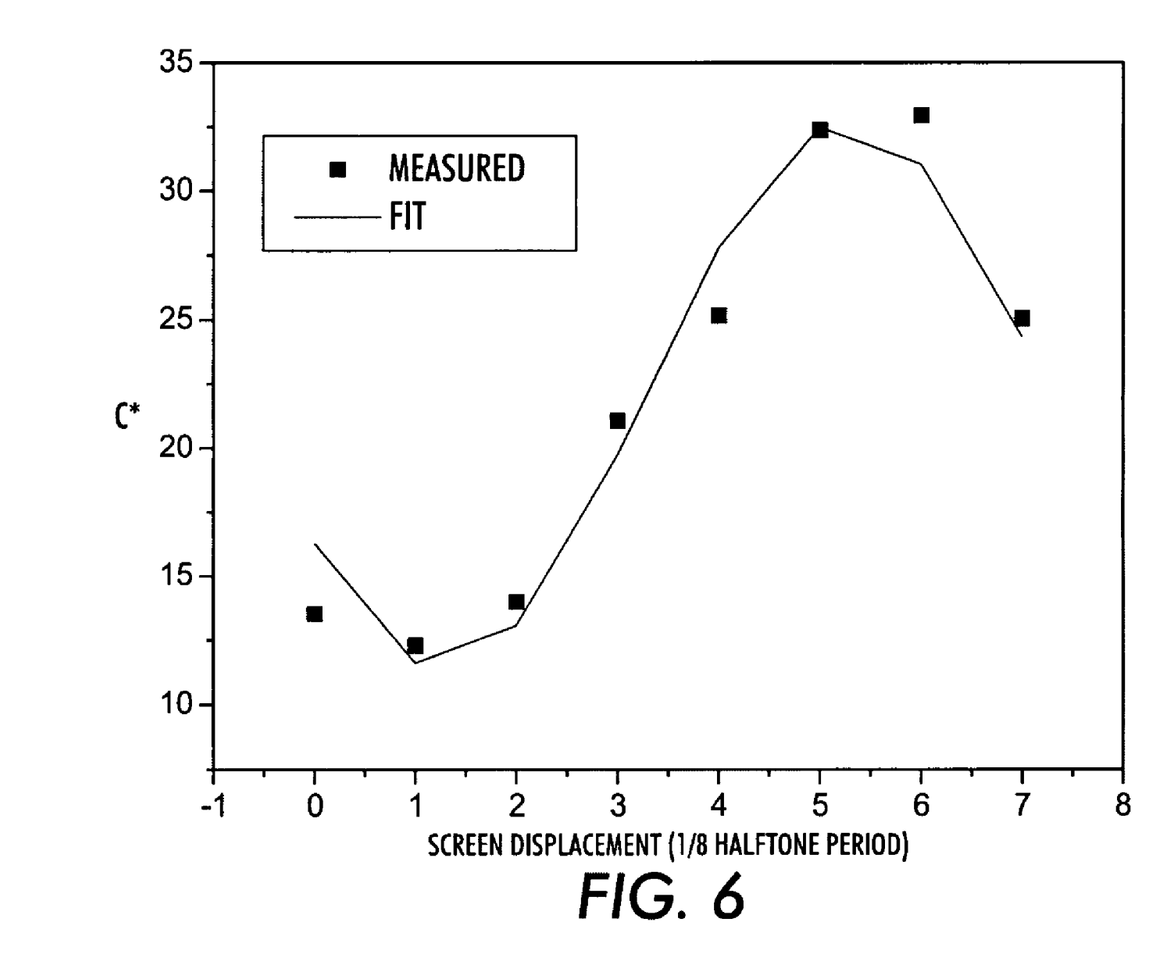
FIG. 6 shows plotted chroma measurements and a fitted curve for a series of patches of the image output by the system shown in FIG. 1, where lines of the image line screen of the series of patches are oriented at 45°.
Figure 7:
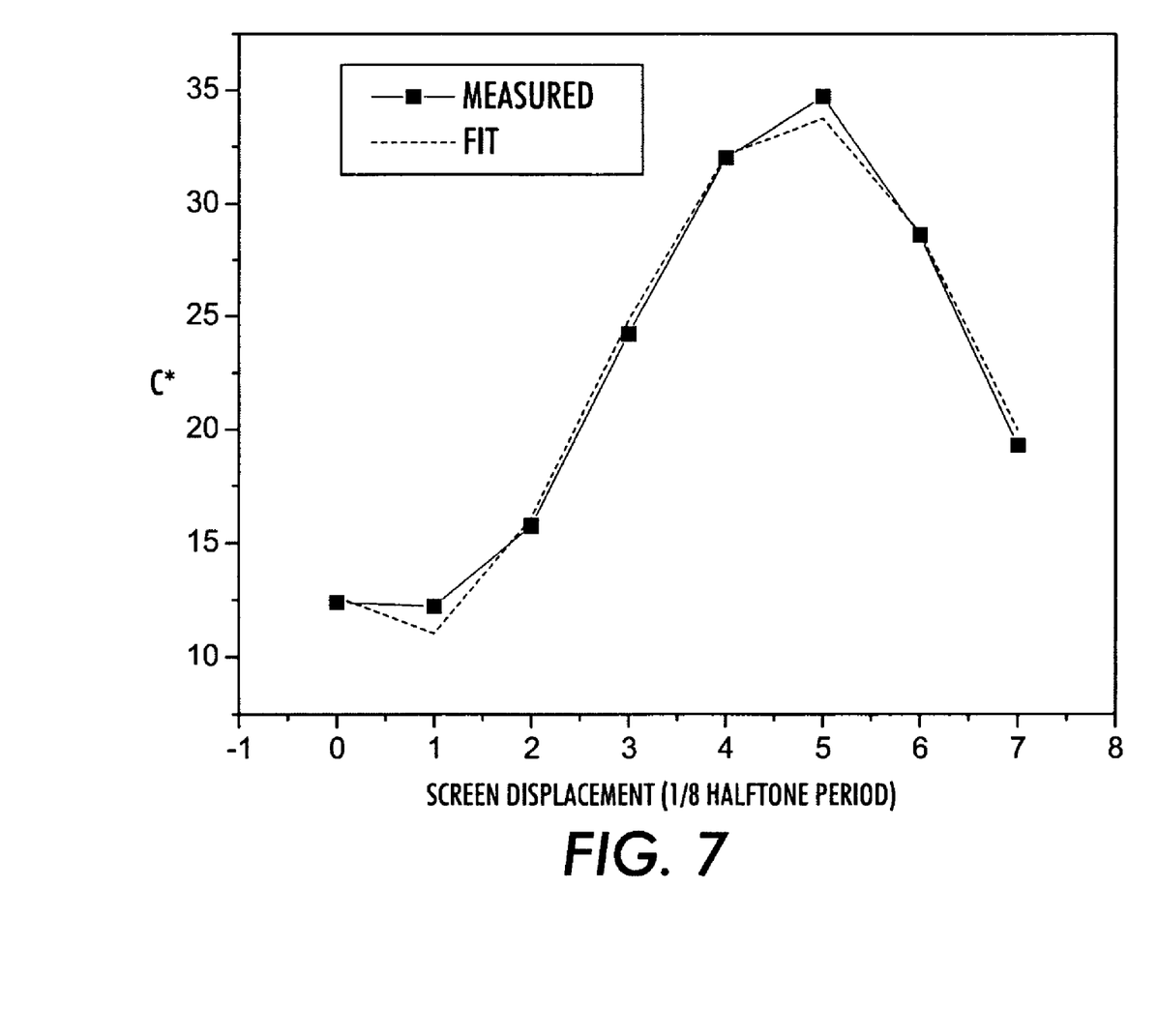
FIG. 7 shows plotted chroma measurements and a fitted curve for a series of patches of the image output by the system shown in FIG. 1, where lines of the image line screen of the series of patches are oriented at 135°.

FIGS. 6 and 7 show plotted chroma measurements and fitted curves for lines of the image line screens oriented at 45° and 135°, respectively, where the line screens of the printer device 102 used have a frequency of 106 lpi (which corresponds to a period of approximately 240 microns).

From the plots shown in FIGS. 6 and 7, screen displacements of −1.27 and −0.73 were determined for the 45 and 135 degree screen orientations, respectively. Calculations performed using Equations (1) and (2) result in estimations for the misregistrations for these orientations:

$$M_{45}^{CM} = -38 \text{ microns}$$

$$M_{135}^{CM} = -22 \text{ microns}$$

From Equation (3) above:

$$M_f^{CM} = -42 \text{ microns}$$

$$M_s^{CM} = -11 \text{ microns}$$

In order to demonstrate the validity of the present disclosure, manual measurements of color separation misregistration were taken using sixteen prior art registration marks for directly measuring the misregistration in the fast and slow scan directions for the same color pair. The prior art registration marks were printed on the output image 107. Results in accordance with the manual measurements taken were as follows:

$$M_f^{CM} = -38 \text{ microns}$$

$$M_s^{CM} = -15 \text{ microns}$$

The results have a standard deviation of approximately 8 microns. The results of the measurements using the prior art registration marks indicate that the results obtained by using the method in accordance with the present disclosure in which the peak phase lag of the chroma is determined was accurate.

Figure 8:
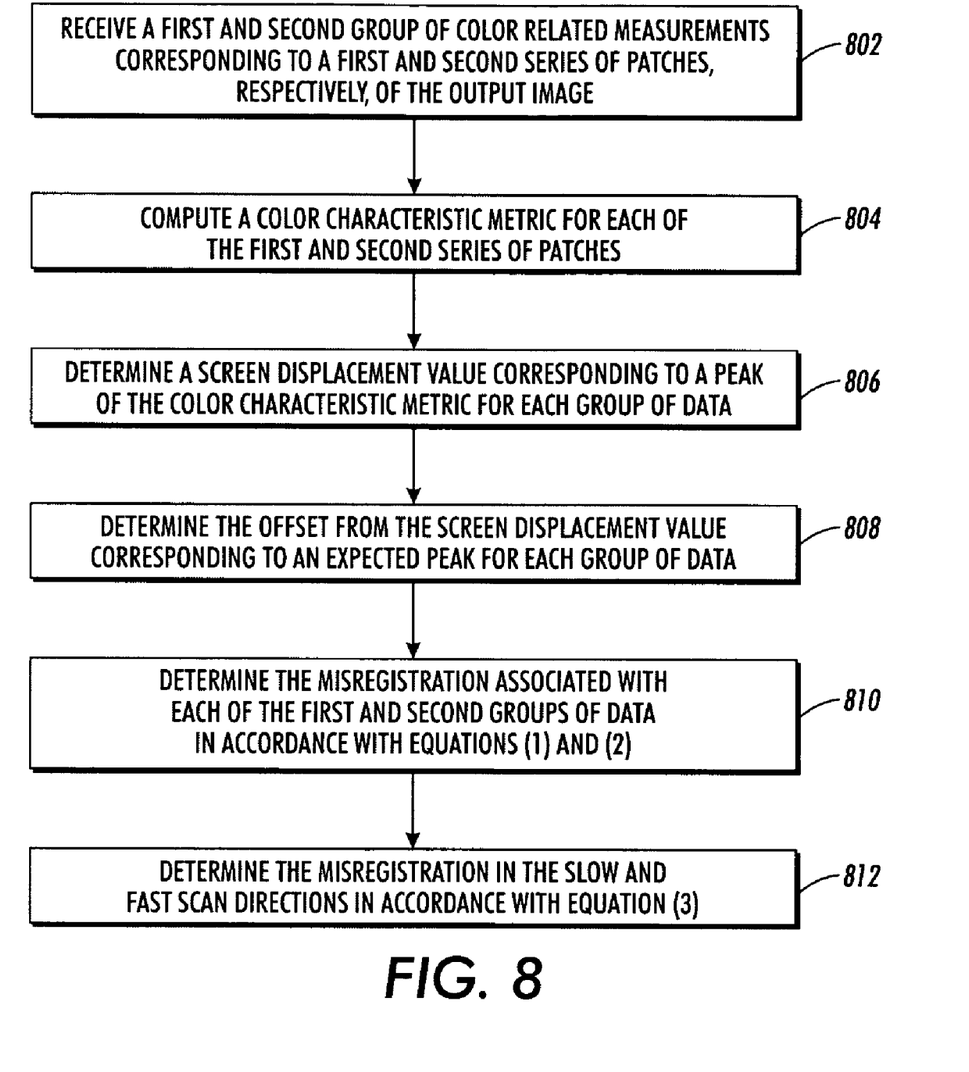
FIG. 8 is flow chart of steps performed by the phase lag analysis module of the exemplary embodiments of the analysis units shown in FIGS. 4 and 5.

FIG. 8 shows a flowchart of steps performed by the phase lag analysis module. At step 802, a first group of color related measurements are received corresponding to a the first series of patches 202 having of the output image 107, and a second group of color measurements are received corresponding to the second series of patches 204 of the output image 107. The patches of the first series 202 include image line screens that are orthogonal relative to the image line screens of the patches of the second series of patches 204.

At step 804, a color characteristic metric, such as chroma or luminance, is computed for each of the series of patches 202 and 204. The computation of the metric can be achieved with a knowledge of the characteristics of the device used to measure the patches. For a spectrophotometer, one can project the spectral output data onto an XYZ color space using conversion tables well known to those skilled in the art of color science. XYZ data can be subsequently transformed to the CIELAB color space, again using well known transformations. In the case if an RGB scanner, a device profile is generally supplied by the manufacturer, and enables the direct conversion from RGB to LAB coordinates.

At step 806, a screen displacement value corresponding to a peak of the color characteristic metric is determined for each group of data. At step 808, the offset from the screen displacement value corresponding to an expected peak is determined for each group of data. At step 810, the misregistration associated with each of the first and second groups of data is determined in accordance with Equations (1) and (2). At step 812, the misregistration in the slow and fast scan directions are determined in accordance with Equations (3).

The present example demonstrates a determination of misregistration of magenta and cyan relative to one another. Other color pairs may be analyzed for determining relative misregistration. For each color pair to be analyzed two series of patches are provided on the input image 105, where the lines of the image line screen used for the first series of patches is orthogonal to the lines of image line screen used for the second series of patches. Six pairs of colors may be analyzed in order to analyze all of the relative color misregistration in the CMYK color separations scheme. It is also possible to analyze three pairs by taking measurements, and deriving the relative registration of the other three pairs from the results of the analysis of the former three pairs. The user may be most interested in analyzing misregistration of color pairs that have the strongest visual impact due to a large variety in chroma, namely selected from CK, MK, YK and/or CM.

The number of patches used per halftone period of a series is not limited to the eight patches shown in the present example. A greater or lesser number of patches per series may be used, and a greater or lesser amount of phase shift may be used between consecutive patches. Analysis of each color pair requires using a pair of patch series, where the parallel lines of the second patch series are oriented at a different angle relative to the parallel lines of the first patch series, where the relative angle is not an integer multiple of 180 degrees. The orientation of lines of the image line screen of the first patch series of the pair of patch series may be orthogonal to the lines of the image screen of the second patch series of the pair of patch series, as demonstrated in the example above using the equations provided, however the disclosure is not limited thereto. Additionally, the respective line orientations are not limited to 45° or 135° as demonstrated in the example above.

In accordance with the present example, the exemplary input image 105 includes a pair of patch series (including the first and second series of patches 202 and 204) for each color pair. Each patch series includes eight patches, and each pair of color patch series includes 16 patches. A pair of color patch series is provided for three respective color pairs, so that the total number of patches is 48. The size of the patches is in accordance with design choice the patches may be positioned in close proximity to one another in order to reduce error, as the misregistration may actually change over the distance of the block of patches.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for characterizing color separation misregistration of a printer device using color separations of a color space for marking a substrate, the method comprising:

receiving by a tangible processor a colorimetric value corresponding to a colorimetric measurement of respective patches of a plurality of patches included in an output image output by the printer device, each patch of the plurality of patches having markings of a first and second color separation of the color space, wherein:

the markings include parallel lines including lines of the first color separation and lines of the second color separation; and the plurality of patches includes at least one series of patches, wherein the lines of the first color separation have different incremental displacements relative to the lines of the second color separation for each respective patch of a series of patches of the at least one series of patches;

fitting a single curve to the received colorimetric values associated with each of the patches of the plurality of patches;

characterizing by the processor misregistration of the first color separation relative to the second color separation using the curve;

determining by the processor a peak received colorimetric value for a patch series of the at least one patch series;

determining by the processor a magnitude of the displacement that corresponds to the peak; and determining by the processor an offset between the determined displacement magnitude and an expected displacement magnitude corresponding to an expected peak colorimetric value associated with ideal color separation registration;

wherein the characterizing of the misregistration is further based on the determined offset.

2. The method according to claim 1, wherein:

the at least one series of patches includes at least one pair of patch series, each pair of patch series including a first and second patch series, wherein the parallel lines of the second patch series are oriented at an angle relative to the parallel lines of the first patch series, wherein the relative angle is not an integer multiple of 180 degrees; and the characterizing of the misregistration is further based on an offset determined for the first patch series and an offset determined for the second patch series.

3. The method according to claim 2, wherein the parallel lines of the second patch series are orthogonal to the parallel lines of the first patch series.

4. A color separation misregistration characterization system, comprising:

a tangible processor for receiving a colorimetric value corresponding to a colorimetric measurement of respective marked patches of plurality of marked patches included in an output image output by a printer device using color separations of a color space for marking a substrate, wherein the plurality of patches includes at least one pair of patch series, each pair of patch series including a first and second series of patches, each patch of the plurality of marked patches having markings of a first and second color separation, wherein:

the markings include parallel lines including lines of the first color separation and lines of the second color separation, wherein the parallel lines of the second patch series are oriented at an angle relative to the parallel lines of the first patch series, wherein the relative angle is not an integer multiple of 180 degrees; and the lines of the first color separation have different incremental displacements relative to the lines of the second color separation for each respective patch of a series of patches of the at least one series of patches;

the processor comprising:

a phase lag analysis module including a series of programmable instructions executable by the processor for:

characterizing misregistration of the first color separation relative to the second color separation for both a fast and slow scan direction, wherein the fast scan direction is a direction of relative movement between a substrate and a device for transferring the color separations to the substrate, and the slow scan direction is a direction perpendicular to the fast direction, wherein the characterization of the misregistration for each of the fast and slow directions uses both the first and second patch series.

5. The system according to claim 4, wherein:

the phase lag analysis module further:

determines for a patch series of the at least one patch series a peak for the received colorimetric value;

determines a magnitude of the displacement that corresponds to the peak; and determines an offset between the determined displacement magnitude and an expected displacement magnitude corresponding to an expected peak colorimetric value associated with ideal color separation registration; and the misregistration characterization is further based on the determined offset.

6. The system according to claim 4, wherein a direction of the displacement of the lines of the first color separation relative to the lines of the second color separation is in a direction that is transverse to an orientation of the parallel lines.

7. The system according to claim 4, wherein a patch series of the at least one series of patches includes a patch in which the lines of the first and second color separations are in a line-off-line configuration relative to one another and another patch in which the lines of the first and second color separations are in a line-on-line configuration relative to one another.

8. The system according to claim 4, wherein the parallel lines of the second patch series are orthogonal to the parallel lines of the first patch series.

9. The system according to claim 8, wherein the parallel lines of the first patch series are oriented at one of 0 and 45 degrees relative to an edge of a substrate marked with the output image.

10. A method for characterizing color separation misregistration associated with marking a substrate, the method comprising:

providing an input image having a plurality of patches including at least one series of patches, each patch having a pattern using a first and second color, wherein:

the pattern of each patch of the input image includes a plurality of parallel lines including at least one line of the first color and at least one line of the second color; and the lines of the first color have different incremental displacements relative to the lines of the second color for each respective patch of a series of patches of the at least one series of patches;

marking a substrate with a copy of the input image using a first and second color separation to correspond to the first and second colors, respectively;

measuring color characteristic of markings of respective copied patches of the copied plurality of patches and generating corresponding colorimetric values;

fitting a single curve to the received colorimetric values associated with each of the patches of the plurality of patches;

determining a peak of the curve;

determining a magnitude of the displacement that corresponds to the peak;

characterizing misregistration of the first color separation markings relative to the second color separation markings based on the measured calorimetric values and the determined displacement magnitude; and determining an offset between the determined displacement magnitude and an expected displacement magnitude corresponding to an expected peak colorimetric value associated with ideal color separation registration;

wherein the characterizing of the misregistration is further based on the determined offset.

11. The method according to claim 10, wherein a direction of the displacement of the lines of the first color relative to the lines of the second color is in a direction that is transverse to an orientation of the parallel lines.

12. The method according to claim 10, wherein a patch series of the at least one series of patches of the input image includes a patch in which the lines of the first and second colors are in a line-off-line configuration relative to one another and another patch in which the lines of the first and second colors separations are in a line-on-line configuration relative to one another.

13. The method according to claim 10, wherein:

the at least one series of patches of the input image includes at least one pair of patch series, each pair of patch series including a first and second patch series, wherein the parallel lines of the second patch series are oriented at an angle relative to the parallel lines of the first patch series; and the characterizing of the misregistration in a single scan direction is further based on an offset determined for the first patch series and an offset determined for the second patch series.

14. The method according to claim 13, wherein the parallel lines of the second patch series are orthogonal to the parallel lines of the first patch series.

15. The method according to claim 14, wherein the parallel lines of the first patch series are oriented at one of 45 and 0 degrees relative to an edge of the substrate.

16. The method according to claim 1, wherein a patch series of the at least one series of patches of the input image includes a patch in which the lines of the first and second colors are in a line-off-line configuration relative to one another and another patch in which the lines of the first and second colors separations are in a line-on-line configuration relative to one another.

17. The system according to claim 4, wherein the lines of the patch having the line-off-line configuration are contiguous, and the substrate is not visible.

18. The method according to claim 10, wherein the lines of the patch having the line-off-line configuration are contiguous, and the substrate is not visible.

19. The method according to claim 2, where in the misregistration is characterized for both a fast and slow scan direction, wherein the fast scan direction is a direction of relative movement between a substrate and a device for transferring the color separations to the substrate, and the slow scan direction is a direction perpendicular to the fast direction, and the characterization of the misregistration for each of the fast and slow directions uses both the first and second patch series.

* * * * *